United States Patent  [11] 3,565,259

[72] Inventors Otto Meyer-Berge
 Idstein, Taunus;
 Ursula Heyse, Bad Soden, Taunus,
 Germany
[21] Appl. No. 793,899
[22] Filed No Drawing. Jan. 24, 1969
[45] Patented Feb. 23, 1971
[73] Assignee Kalle Aktiengesellachaft
 Wiesbaden-Biebrich,
[32] Priority Jan. 26, 1969
[33] Germany
[31] 1,611,108

[54] PROCESS FOR THE MANUFACTURE OF POROUS MEMBRANES
 11 Claims, No Drawings
[52] U.S. Cl. .................................................. 210/500
[51] Int. Cl. ................................................. B01d 39/16

[50] Field of Search ........................................... 252/316;
 162/358; 210/500; 34/115, 122

[56] References Cited
 UNITED STATES PATENTS
 1,593,678  7/1926  Statler .......................... 34/122X
 3,350,232 10/1967  Ryhiner ........................ 252/316X
 3,430,352  3/1969  Fleissner ..................... 34/115X Primary Examiner—Samih N. Zaharna
Attorney—James E. Bryan ABSTRACT: This invention relates to an improvement in a process for the manufacture of porous membranes, and to the membranes so produced. In the process, porous membranes having an oriented capillary structure are produced by diffusion of multivalent cations into polyelectrolyte sols, and the improvement comprises dehydrating, on porous supports, layers of the capillary gel obtained, and then drying them.

PROCESS FOR THE MANUFACTURE OF POROUS MEMBRANES

The present invention relates to a process for the manufacture of porous membranes having an oriented capillary structure, by diffusion of multivalent cations into polyelectrolyte sols.

It is known that by layering a sodium alginate sol with a copper chloride or copper nitrate solution, a gel having straight, uniform capillaries of circular cross section is obtained. By a drop-wise disintegration process, numerous droplets are formed in the growing gel thus imparting a capillary structure thereto, while an ionotropic orientation of the polyelectrolyte takes place at the same time (see DBP 1,011,853).

Further, it is known that by dehydration and incorporation of suitable polymerizable components, the gel membranes formed are stabilized in their structure to such a degree that they acquire the mechanical strength and flexibility required for technical applications. This process is performed by first completely displacing the water contained in the gel by repeated treatment with a solvent, and then incorporating in the gel one or more components capable of polymerization or polycondensation. Subsequently, polymerization is effected by the application of heat or actinic radiation.

According to the present invention, it now has been found that the time-consuming and technically expensive dehydration of the gel membranes by means of a series of solvent treatments can e be eliminated by a simple procedure, by which novel and technically desirable properties are imparted to the membrane film. In the process of the invention, layers of the capillary gel obtained are dehydrated on porous supports, if desired with suction, and then dried. After the excess of electrolyte solution has been removed, the cut, capillary membranes in the form of the gel are placed on supports having a strongly dehydrating action, such as plates of clay, porcelain, plaster of Paris, bentonite, kieselguhr, chalk and the like. Porous supports with a smooth surface, such as sintered glass, plastic material or metal, also may be used, applying a vacuum to one surface. In both cases, the gel structure condenses quickly by dehydration and the membrane shrinks to about 20 percent of its original thickness. Practically no shrinkage occurs in the two other directions, so that the uniform capillary structure, the diameter of the individual capillaries, and the ratio of pore area to the total area of the membrane remain practically unchanged. The shrinkage of the gel structure is irreversible, so that no swelling or increase in thickness takes place upon contact with water.

Due to the compression of the gel, considerably thinner porous membranes can be produced than were hitherto possible owing to the technically limited cutting thickness of the gel membranes. By the dehydration procedure and the ensuing drying process, the structure of the membranes is condensed and solidified to such a degree that, in the case of many applications where no substantial mechanical stresses occur, it is no longer necessary to stabilize the gel membranes by the additional introduction of polymerizable components.

The process of the invention is particularly advantageous due to the great number of variations which are possible, and, in addition to an abbreviation and simplification of the procedure, the process leads to products with novel, advantageous properties.

As an example, by the application of pressure to the gel layer during the dehydration phase, it also is possible to cause a deformation or contraction of the pores, by means of which the permeability of the pores is reduced, but not completely destroyed. This effect is of considerable practical importance for some applications, e.g. for dust filtration.

The procedure may be further simplified and accelerated by performing the dehydration process on continuously operating suction drums.

If an additional dehydration is performed by treatment with a water-miscible organic solvent, the time required for drying is only a few minutes, as compared to several hours for drying water-containing gel layers.

Highly elastic membranes of a high bending strength are obtained by impregnating the dehydrated membrane with glycol or polyglycol, glycerol or the like before drying it.

An additional consolidation of the thin membranes by cross-linking with polymerizable substances or by impregnation with lacquers or dispersions, depending upon their future applications also is possible without impairing the porous structure of the membranes. The treatment is in the conventional manner, the introduction of polyurethanes by polymerization being particularly favorable, because it imparts a high degree of elasticity to the membrane. Further, it is particularly advantageous, for processing reasons, to effect a solidification of the membrane by impregnation with aqueous solutions or dispersions of synthetic resins, because the use of volatile or inflammable solvents thus can be easily avoided. Suitable synthetic resins for this purpose are mainly those based upon melamine/epoxy resin esters or alkyd resins, the resins being cured in the conventional manner by a catalytic or thermal process.

Porous membranes with a very smooth, level surface are obtained when the membranes are clamped onto smooth, arched surfaces while being dried at normal or elevated temperatures.

The membranes produced in accordance with the present invention, which have a thickness of about 50 to 400$\mu$, have the advantage over the hitherto known membranes of about 10 times this thickness, in that, due to their smaller thickness, the size of their pores is much more accurately defined and deviations in the direction of the capillaries are not longer noticeable.

The thin membranes preferably are used as special sieves and filters with a high throughput per cross section, for the filtration of gases and liquids, further as catalyst screens and supports, and also as film screens for reproduction purposes. Due to their small thickness, the application of a metal layer by currentless or galvanic metallization or by vapor-deposition is much easier and offers further possibilities of application for the new material.

The following examples further illustrate several embodiments of the invention:

EXAMPLE 1

By diffusion of copper ions from 1 N copper nitrate solution into a 1.8 percent by weight sodium alginate sol, a capillary gel having a thickness of about 15 mm. is produced. By means of a horizontally swinging knife, the uppermost layer, which is free from pores, is removed, and then gel layers of a thickness of about 2 mm. are cut off in the same manner. The gel layers are placed on highly absorptive clay plates, and after 3 minutes have lost 80 percent of their thickness by shrinkage. When the gel layers are placed on porous plates of sintered glass and subjected to reduce pressure from one side, a shrinkage of 80 percent takes place within 5 minutes. The porous membranes shrunk and substantially dehydrated in this manner are dried, either between perforated metal plates at temperatures between 60 and 80° C., or, after being clamped onto a glass cylinder, at room temperature. Porous membranes of a thickness of about 200 $\mu$m are thus obtained.

EXAMPLE 2

The membrane is dehydrated and caused to shrink as described in example 1 and then placed in acetone. When it is dried at room temperature while clamped onto a glass cylinder, the drying time is less than 10 percent of the time required when drying from an aqueous phase.

EXAMPLE 3

A membrane which has been produced as described in example 1 is placed in a solution of glycerol in water and cautiously squeezed off. After drying under the conditions stated in example 1 or example 2, an elastic membrane of a high bending strength is obtained. Instead of a solution of glycerol in water, it is also possible to use a solution of glycerol in a water-miscible solvent, such as ethanol or acetone.

EXAMPLE 4

When relatively thick gel layers of 4 mm. thickness are used, which are dehydrated between absorptive porous clay plates with simultaneous application of pressure, membranes are obtained the capillaries of which are narrowed by deformation, so that their permeability is reduced, but not completely destroyed. The membranes are further processed as described in examples 1 to 3.

EXAMPLE 5

A membrane which was produced in accordance with example 1 and freed from traces of water by repeated treatment with acetone, is placed into a 50 percent benzene solution of hexamethylene diisocyanate and a polyester and polymerized or cross-linked by a 6 hours treatment at about 70° C. Very thin porous membranes of high elasticity, good mechanical strength and chemical resistance are obtained whose thickness is only about 5 to 10 percent that of membranes produced by the processes hitherto known.

EXAMPLE 6

A membrane produced in accordance with example 1 is impregnated by immersing it in an aqueous solution of a low viscosity polymer lacquer based on melamine. Hardening is effected in known manner by the addition of ammonium nitrate and heating to 100° C. The capillaries are kept open by means of a directed airstream which simultaneously causes evaporation of the water. Porous membranes are thus obtained which have a high elasticity and improved mechanical resistance.

EXAMPLE

Porous membranes of a thickness of about 400 $\mu$m which were produced in accordance with example 1 or example 2 and still contain traces of water or solvent, are dried by clamping them onto a smooth metal cylinder at room temperature. Thin porous membranes with a very smooth, level surface are thus obtained.

It will be obvious to those skilled in the art that many modifications may be made within the scope of the present invention without departing from the spirit thereof, and the invention includes all such modifications.

We claim:

1. In a process for the manufacture of porous membranes having an oriented capillary structure, by diffusion of multivalent cations into polyelectrolyte sols, the improvement which comprises dehydrating, on highly dehydrating supports, layers of the capillary gel obtained, and then drying them.

2. A process according to claim 1 in which pressure is applied to the gel layer during dehydration.

3. A process according to claim 1 in which dehydration is effected on a rotating cylindrical support of highly dehydrating material.

4. A process according to claim 1 in which, after dehydration, the membrane is treated with at least one water-miscible solvent and then dried.

5. A process according to claim 1 in which the membranes are stabilized by the introduction of a polymerizable material.

6. A process according to claim 5 in which the polymerizable material forms a polyurethane upon polymerization.

7. A process according to claim 1 in which, before drying, the dehydrated membrane is impregnated with a compound selected from the group consisting of a glycerol, a glycol, or a polyglycol.

8. A process according to claim 1 in which the dehydrated membrane is impregnated with an aqueous solution or dispersion of a synthetic resin, and the resin is cured.

9. A process according to claim 1 in which drying is effected by clamping the membrane to a smooth, curved surface.

10. A process according to claim 1 in which suction is applied to the supports during dehydration.

11. A porous membrane produced by the process according to claim 1 and having an oriented capillary structure and a thickness between about 50 to 400$\mu$.